No. 803,105. PATENTED OCT. 31, 1905.
G. F. KEATING.
CLOTHES LINE REEL.
APPLICATION FILED JUNE 7, 1905.

WITNESSES:
W. F. Koyle.
Geo. E. Tew.

INVENTOR
George F. Keating,
BY Milo B. Stevens & Co.
Attorneys.

UNITED STATES PATENT OFFICE.

GEORGE F. KEATING, OF BLOOMINGTON, ILLINOIS.

CLOTHES-LINE REEL.

No. 803,105. Specification of Letters Patent. Patented Oct. 31, 1905.

Application filed June 7, 1905. Serial No. 264,135.

*To all whom it may concern:*

Be it known that I, GEORGE F. KEATING, a citizen of the United States, residing at Bloomington, in the county of McLean and State of Illinois, have invented new and useful Improvements in Clothes-Line Reels, of which the following is a specification.

This invention is a reel attachable to a post or side of a building, and is intended to provide means for winding up a clothes or other line or for making the rope taut.

Figure 1:
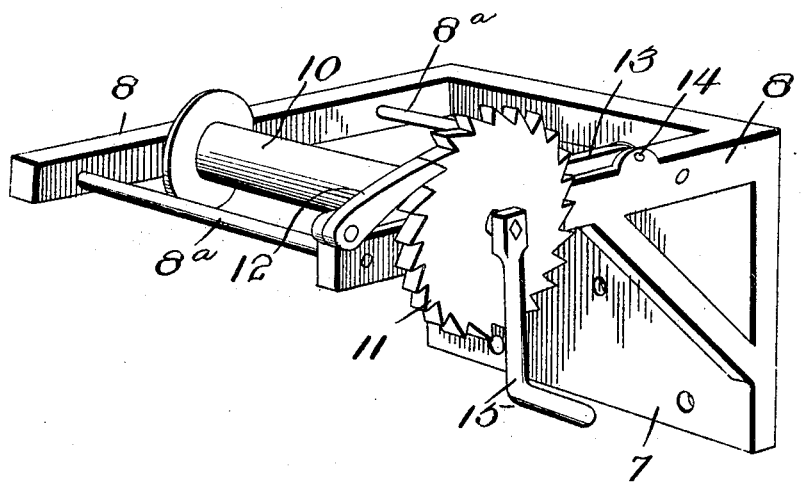
Figure 2:
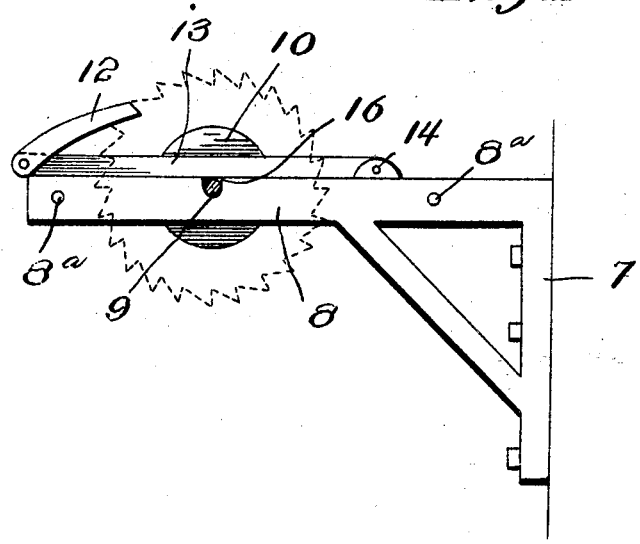

In the accompanying drawings, Figure 1 is a perspective view of the device. Fig. 2 is a side view with the ratchet-wheel removed.

In the drawings, 7 is a bracket-base attachable to a post or wall and having parallel arms 8, upon which is mounted a cross-shaft 9, provided with a spool 10. The shaft 9 fits at the end farthest from the crank in a hole in one of the arms 8 and at the end nearest the crank in a notch 16 in the other arm, adjacent which it has a ratchet-wheel 11. A pawl 12 is hinged to a link 13, which is hinged at 14 upon one of the arms 8 and extends along the top of the arm over the notch 16.

15 is a crank-handle for operating the shaft and spool, and upon this spool is wound or tightened the clothes-line. Cross-rods $8^a$ may be employed to strengthen the bracket.

When the pawl is in engagement with the ratchet, the link 13 is held down over the notch 16, so that the shaft 9 is held in place by the tension of the line. The spool and shaft can be removed to carry the line in the house or elsewhere by disengaging the pawl and lifting the link.

What I claim as new, and desire to secure by Letters Patent, is—

A line-reel comprising a bracket having projecting arms, a crank-shaft having a spool and a ratchet and fitting in a notch in one of the arms, a link hinged to said arm and extending over the notch to hold the shaft therein, and a pawl carried by the link and engageable with the ratchet.

In testimony whereof I have signed my name to this specification in the presence of two subscribing witnesses.

GEORGE F. KEATING.

Witnesses:
WILLIAM GAHART,
MICHAEL H. KOE.